US008534928B2

(12) United States Patent
Cooke et al.

(10) Patent No.: US 8,534,928 B2
(45) Date of Patent: Sep. 17, 2013

(54) OPTICAL FIBER ASSEMBLIES, OPTICAL FIBER ORGANIZERS AND METHODS OF FABRICATING OPTICAL FIBER ASSEMBLIES

(75) Inventors: Terry L. Cooke, Hickory, NC (US); Tory A. Klavuhn, Newton, NC (US); Matthew W. Smith, Lenoir, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 120 days.

(21) Appl. No.: 13/304,982

(22) Filed: Nov. 28, 2011

(65) Prior Publication Data
US 2013/0136401 A1     May 30, 2013

(51) Int. Cl.
*G02B 6/00* (2006.01)
*G02B 6/36* (2006.01)
*G02B 6/38* (2006.01)

(52) U.S. Cl.
USPC ............................................. 385/78; 385/88

(58) Field of Classification Search
USPC ....................................... 385/80–90, 92, 147
See application file for complete search history.

(56) References Cited

U.S. PATENT DOCUMENTS

| | | | |
|---|---|---|---|
| 5,703,982 A * | 12/1997 | Takizawa | 385/78 |
| 6,409,393 B1 | 6/2002 | Grois et al. | 385/78 |
| 6,454,464 B1 | 9/2002 | Nolan | 385/60 |
| 6,505,976 B1 | 1/2003 | Grois et al. | 385/78 |
| 6,536,956 B2 | 3/2003 | Luther et al. | 385/86 |
| 6,669,378 B2 * | 12/2003 | Nobuhara et al. | 385/84 |
| 6,702,479 B2 | 3/2004 | Yang | 385/78 |
| 7,039,261 B2 * | 5/2006 | Fu et al. | 385/11 |
| 7,186,031 B2 | 3/2007 | Yang et al. | 385/53 |
| 7,204,644 B2 * | 4/2007 | Barnes et al. | 385/77 |
| 7,264,402 B2 | 9/2007 | Theuerkorn et al. | 385/59 |
| 7,330,624 B2 | 2/2008 | Isenhour et al. | 385/134 |
| 7,429,136 B2 | 9/2008 | Lewallen et al. | 385/71 |
| 7,452,139 B2 | 11/2008 | Wang et al. | 385/92 |
| 7,537,393 B2 | 5/2009 | Anderson et al. | 385/54 |
| 7,539,367 B2 * | 5/2009 | Tamura et al. | 385/14 |
| 7,572,064 B2 * | 8/2009 | deJong | 385/65 |
| 7,578,623 B2 | 8/2009 | Wang et al. | 385/88 |
| 7,596,293 B2 | 9/2009 | Isenhour et al. | 385/134 |
| 7,654,747 B2 | 2/2010 | Theuerkorn et al. | 385/59 |
| 7,728,972 B2 | 6/2010 | Yang | 356/326 |
| 7,742,667 B2 | 6/2010 | Paschal et al. | 385/109 |
| 7,758,257 B2 | 7/2010 | Anderson et al. | 385/87 |
| 7,785,019 B2 | 8/2010 | Lewallen et al. | 385/75 |
| 7,815,377 B2 * | 10/2010 | Doss et al. | 385/98 |
| 2001/0010842 A1 * | 8/2001 | Kinnunen et al. | 427/557 |
| 2002/0102069 A1 * | 8/2002 | Nobuhara et al. | 385/84 |

(Continued)

*Primary Examiner* — Akm Enayet Ullah

(57) ABSTRACT

A ferrule assembly includes a ferrule comprising a ferrule boot insertion end and a ferrule boot. The ferrule boot includes a lower component and an upper component. The lower component of the ferrule boot includes a first grooved surface that includes a plurality of first grooves that are dimensioned to receive a plurality of optical fibers. The upper component includes a second grooved surface that includes a plurality of second grooves that are dimensioned to receive the plurality of optical fibers. In one embodiment, the lower component is coupled to the upper component such that individual ones of the plurality of first grooves are substantially aligned with individual ones of the plurality of second grooves. The lower component and the upper component also define a fiber insertion end and a ferrule insertion end of the ferrule boot. The ferrule insertion end of the ferrule boot is at least partially positioned within the ferrule at the ferrule boot insertion end.

24 Claims, 9 Drawing Sheets

(56) References Cited

U.S. PATENT DOCUMENTS

| | | | |
|---|---|---|---|
| 2002/0110333 A1 | 8/2002 | Yang | 385/78 |
| 2003/0021548 A1 | 1/2003 | Luther et al. | 385/86 |
| 2003/0048997 A1* | 3/2003 | Nobuhara et al. | 385/84 |
| 2005/0084216 A1 | 4/2005 | Yang et al. | 385/71 |
| 2005/0084221 A1 | 4/2005 | Yang et al. | 385/114 |
| 2005/0238292 A1* | 10/2005 | Barnes et al. | 385/78 |
| 2006/0115218 A1 | 6/2006 | Howard et al. | 385/59 |
| 2006/0204178 A1 | 9/2006 | Theuerkorn et al. | 385/59 |
| 2006/0280408 A1 | 12/2006 | Anderson et al. | 385/54 |
| 2006/0280413 A1 | 12/2006 | Paschal et al. | 385/112 |
| 2007/0025665 A1 | 2/2007 | Dean, Jr. et al. | 385/78 |
| 2007/0160327 A1 | 7/2007 | Lewallen et al. | 385/53 |
| 2007/0172172 A1 | 7/2007 | Theuerkorn et al. | 385/53 |
| 2007/0274658 A1 | 11/2007 | Isenhour et al. | 385/134 |
| 2008/0019646 A1* | 1/2008 | deJong | 385/99 |
| 2008/0044140 A1 | 2/2008 | Wang et al. | 385/88 |
| 2008/0044143 A1 | 2/2008 | Wang et al. | 385/92 |
| 2008/0089651 A1 | 4/2008 | Lewallen et al. | 385/71 |
| 2008/0101751 A1 | 5/2008 | Luther et al. | 385/59 |
| 2008/0131056 A1 | 6/2008 | Isenhour et al. | 385/71 |
| 2009/0196553 A1 | 8/2009 | Anderson et al. | 385/54 |
| 2010/0124394 A1* | 5/2010 | Meek et al. | 385/73 |
| 2010/0239216 A1 | 9/2010 | Paschal et al. | 385/113 |
| 2010/0254659 A1 | 10/2010 | Anderson et al. | 385/54 |
| 2010/0310213 A1 | 12/2010 | Lewallen et al. | 385/75 |
| 2011/0129185 A1 | 6/2011 | Lewallen et al. | 385/53 |
| 2011/0129186 A1 | 6/2011 | Lewallen et al. | 385/59 |

* cited by examiner

OPTICAL FIBER ASSEMBLIES, OPTICAL FIBER ORGANIZERS AND METHODS OF FABRICATING OPTICAL FIBER ASSEMBLIES

FIELD

The present specification generally relates to optical fiber assemblies, and more particularly to optical fiber assemblies including ferrule assemblies and methods of fabricating optical fiber assemblies.

BACKGROUND

Optical fiber communication systems typically include optical fiber connectors. For instance, one or more optical fiber connectors can be used to join adjacent segments of optical fiber together for creating optical connections that can be connected, disconnected, and/or reconfigured as desired. For instance, one or more optical fiber connectors can be used for joining an optical fiber segment to an optical device or joining two optical fiber segments. Typical optical fiber connectors include a conventional ferrule designed to hold an optical fiber in an appropriate orientation for optically joining the end of the optical fiber segment to an optical interface of an optical device or another optical fiber segment.

Conventional optical ferrule assemblies include one or more optical fibers that typically extend (i.e., protrude) from a face of a conventional ferrule and may protrude at an appropriate distance from the face of the ferrule as desired. In order to provide the desired alignment, the ferrules define a pair of elongate alignment holes that receive and cooperate with respective alignment members, such as guide pins, to accurately align opposing ferrules, and in turn, the optical fibers mounted within the multifiber ferrules. In other words, the ferrule has alignment structure for precisely mating the optical fibers secured within the ferrule with a complimentary device for the transmission of optical signals.

Optical fibers have also been arranged into fiber arrays for ease of installation into the optical fiber connectors. One known process of arranging optical fibers into optical fiber arrays is commonly referred to as ribbonization. One common approach for the ribbonization of optical fibers includes the use of tape that is applied along a suitable short length at the ends of the loose optical fibers for maintaining the optical fibers in a desired sequence. In other words, the optical fibers are arranged in the desired sequence at the ends of the fibers and a short piece of tape is applied to the fibers to maintain their position and aid the insertion of the plurality of fibers into the ferrule. By way of example, the ribbonized length may be about one inch or longer as desired and trimming of the optical fibers and/or tape may be required to remove any excess length of the ribbonized portion. Such ribbonization of optical fibers can be labor intensive and time-consuming. Thus, there is an unresolved need to quickly and easily arrange optical fibers for insertion into a ferrule of an optical fiber assembly.

SUMMARY

In one embodiment, a ferrule assembly includes a ferrule comprising a ferrule boot insertion end. A ferrule boot includes a lower component comprising a first grooved surface. The first grooved surface includes a plurality of first grooves that are dimensioned to receive a plurality of optical fibers. An upper component includes a second grooved surface. The second grooved surface includes a plurality of second grooves that are dimensioned to receive the plurality of optical fibers. The lower component is coupled to the upper component such that individual ones of the plurality of first grooves are substantially aligned with individual ones of the plurality of second grooves. The lower component and the upper component define a fiber insertion end and a ferrule insertion end of the ferrule boot. The ferrule insertion end of the ferrule boot is at least partially positioned within the ferrule at the ferrule boot insertion end.

In another embodiment, an optical fiber organizer includes a lower component comprising a first grooved surface. The first grooved surface includes a plurality of first scalloped-shaped grooves that are dimensioned to receive a first plurality of optical fibers. An upper component includes a second grooved surface. The second grooved surface includes a plurality of second scalloped-shaped grooves that are dimensioned to receive a second plurality of optical fibers. An intermediate fiber holder includes a third grooved surface and a fourth grooved surface. The third grooved surface includes a plurality of third scalloped-shaped grooves that are dimensioned to receive the first plurality of optical fibers. The fourth grooved surface includes a plurality of fourth scalloped-shaped grooves that are dimensioned to receive the second plurality of optical fibers. The first grooved surface of the lower component is coupled to the third grooved surface of the intermediate fiber holder, and the second grooved surface of the upper component is coupled to the fourth grooved surface of the intermediate fiber holder, such that the intermediate fiber holder is positioned between the lower component and the upper component. Individual ones of the plurality of first scalloped-shaped grooves are substantially aligned with individual ones of the plurality of third scalloped-shaped grooves, thereby forming a first plurality of fiber receiving channels positioned in a first plane. Individual ones of the plurality of second scalloped-shaped grooves are substantially aligned with individual ones of the plurality of fourth scalloped-shaped grooves, thereby forming a second plurality of fiber receiving channels positioned in a second plane.

In another embodiment, an optical fiber assembly includes a plurality of optical fibers having an insertion end. A ferrule boot includes a lower component comprising a first grooved surface. The first grooved surface comprises a plurality of first scalloped-shaped grooves. An upper component includes a second grooved surface. The second grooved surface includes a plurality of second scalloped-shaped grooves. The lower component is coupled to the upper component such that individual ones of the plurality of first scalloped-shaped grooves are substantially aligned with individual ones of the plurality of second scalloped-shaped grooves, thereby forming a plurality of fiber receiving channels extending lengthwise through the ferrule boot. The plurality of optical fibers are secured within the plurality of fiber receiving channels. The lower component and the upper component define a fiber insertion end and a ferrule insertion end. A ferrule includes a ferrule channel therein and a ferrule boot insertion end. The ferrule insertion end of the ferrule boot is positioned within the ferrule channel at the ferrule boot insertion end of the ferrule. The plurality of optical fibers is secured within the ferrule by an epoxy. The ferrule boot prevents the epoxy from escaping the ferrule channel.

In another embodiment, a method of fabricating an optical fiber assembly is provided. The method includes positioning a plurality of optical fibers onto a portion of a ferrule boot in a desired sequence such that an exposed portion of the plurality of optical fibers extend beyond an edge of the ferrule boot. The ferrule boot includes a lower component comprising a first grooved surface. The first grooved surface includes a plurality of first grooves. An upper component is coupled to the lower component. The upper component comprises a second grooved surface. The second grooved surface comprises a plurality of second grooves. Individual ones of the plurality of first grooves are substantially aligned with individual ones of the plurality of second grooves, thereby forming a plurality of fiber receiving channels extending lengthwise through the ferrule boot. The lower component and the upper component define a fiber insertion end and a ferrule insertion end of the ferrule boot. The upper component is secured to the lower component such that the plurality of optical fibers are positioned within the plurality of fiber receiving channels by a pressure fit. The exposed portion of the plurality of optical fibers is positioned into a ferrule. The plurality of optical fibers is secured to the ferrule.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute apart of this specification. The drawings illustrate the various embodiments described herein, and together with the description serve to explain the principles and operations of the claimed subject matter.

DETAILED DESCRIPTION

Embodiments described herein generally relate to optical fiber assemblies that include a ferrule boot that, itself, holds loose optical fibers in place relative to each other during assembly of the optical fiber assembly. The ferrule boot includes components having grooved surfaces that, when the components are brought together, form a plurality of fiber receiving channels that extend lengthwise through the ferrule boot. A plurality of optical fibers may lay within the plurality of fiber receiving channels. The ferrule boot with the optical fibers may be inserted or otherwise connected to a ferrule.

Figure 1:
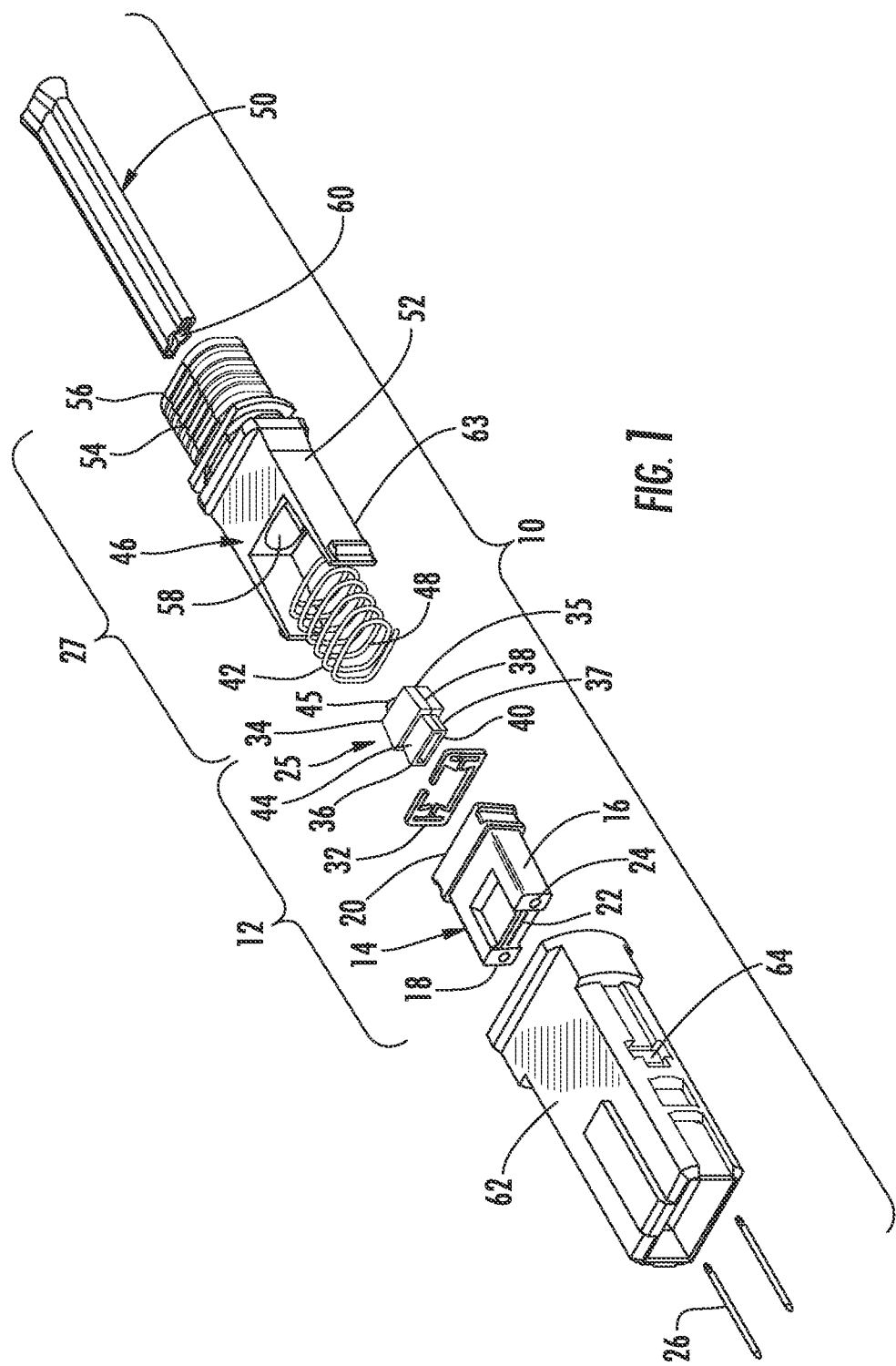
FIG. 1 is an exploded, perspective view of an optical fiber assembly according to one or more embodiments shown and described herein.

Referring to FIG. 1, an exploded perspective view of an exemplary optical fiber assembly 10 includes a multifiber ferrule assembly 12 including a ferrule 14 and a ferrule boot 25 that can be connected to the ferrule 14. A spring push assembly 27 can exert a biasing force through the ferrule boot 25 and on the ferrule 14, for example, when a pair of ferrule assemblies are brought into physical contact and mated together. The optical fiber assembly 10 can comprise various configurations.

The multifiber ferrule assembly 12 includes the ferrule 14, which maybe an MT-type multifiber ferrule having a ferrule body 16 that is generally rectangular in lateral cross-section. Although an MT-type ferrule is illustrated and described herein, the ferrule 14 need not be an MT-type ferrule and may be any other type of multifiber ferrule. Regardless of the type, the ferrule 14 extends lengthwise within the multifiber ferrule assembly 12 between an end face 18 and an opposed rear face 20 or ferrule boot insertion end. In addition, the ferrule body 16 defines a plurality of bores 22 exposed through the end face 18. The bores 22 are arranged in a laterally extending linear row for receiving the end portions of respective optical fibers. Although the embodiments of the ferrule 14 illustrated herein define a total of twelve bores 22 such that the multifiber ferrule 14 can be mounted upon the end portions of twelve individual optical fibers, the end face 18 may have any number of bores, such as 2, 4, 6, 8, 10 or more. In addition, the ferrule 14 may include more than a single linear row of bores 22, such as two or more rows of bores 22 (e.g., of 12 bores per row). Furthermore, the bores 22 need not be arranged in one or more laterally extending linear rows. For example, any number of bores 22 may be arranged in any predetermined pattern on the end face 18 of the ferrule 14.

The ferrule body 16 may also have at least one elongate guide pin hole 24 also referred to as an alignment hole. The guide pin hole 24 opens through the end face 18 and is adapted to receive a respective guide pin 26 to align the ferrule 14 with an opposing ferrule of a mating connector. In the exemplary embodiments shown herein, the ferrule body 16 at least partially defines at least one or a pair of guide pin holes 24 for receiving respective guide pins 26. Each elongate guide pin hole 24 defined by the ferrule body 16 may, in turn, define a longitudinal axis extending through the center of the guide pin hole 24. The ferrule 14 is manufactured such that the longitudinal axis of each guide pin hole 24 is parallel to the bores 22 extending lengthwise through the ferrule body 16 and perpendicular to the end face 18. As illustrated in FIG. 1, the multifiber ferrule assembly 12 has a male configuration because the ferrule 14 is provided with the pair of guide pins 26 and a guide pin retainer, or pin keeper 32. The pin keeper 32 is positioned adjacent the rear face 20 of the ferrule body 16 to secure the guide pins 26 within the guide pin holes 24. In other embodiments, the pin keeper 32 may not be provided. The guide pins 26 are secured such that their free ends protrude forwardly from the end face 18 of the ferrule body 16 a sufficient distance to engage the guide pin holes of the ferrule of a mating connector, thereby aligning the optical fibers mounted within the respective bores 22 of the opposing ferrules. The free ends of the guide pins 26 may be tapered and/or the guide pin holes 24 may be provided with a lead-in chamfer to facilitate insertion of the guide pins 26 into the guide pin holes 24 and to reduce pin stubbing and/or damage to the end face 18 during mating of the opposing ferrules.

The optical fiber assembly 10 further includes the ferrule boot 25 that includes a spring seat 34 at an optical fiber insertion end 35 and a plurality of fiber receiving channels 36 that extend from the optical fiber insertion end 35 to a ferrule insertion end 37 for receiving a plurality of optical fibers. The plurality of fiber receiving channels 36 may generally be formed by an upper component 38 and a lower component 40. As will be described in greater detail below, the upper component 38 and the lower component 40 may couple together to form the plurality of fiber receiving channels 36.

The ferrule boot 25 is positioned adjacent the rear face 20 of the ferrule body 16, between the ferrule 14 and a coil spring 42 (or other suitable biasing member) of the spring push assembly 27. In some embodiments, the ferrule 14 may include a ferrule boot insertion stop 39 (FIG. 2) that locates the ferrule boot 25 in the ferrule 14. The ferrule boot 25 may maintained within the ferrule 14 (FIG. 2) using any suitable connection such as by a snap fit, an interference fit or an adhesive. The plurality of fiber receiving channels 36 extending through the ferrule boot 25 allows end portions of the optical fibers to pass through the ferrule boot 25 to the rear face 20 of the ferrule 14. In some embodiments, the ferrule boot 25 includes a forward portion 44 that engages and retains the pin keeper 32 between the ferrule boot 25 and the ferrule 14, and thereby securing the guide pins 26 within the guide pin holes 24 of the ferrule 14. The plurality of optical fibers is secured within a ferrule channel of the ferrule 14 by an epoxy. The ferrule boot 25 can prevent the epoxy from escaping the ferrule channel of the ferrule 14. The spring seat 34 may engage the forward-most coil of the coil spring 42. A force centering element 45 may be provided at the spring seat 34 that is used to engage the coil spring 42. The force centering element 45 may also include a spring cup interface portion that facilitates alignment of the coil spring 42.

The coil spring 42 is positioned between the spring seat 34 of the ferrule boot 25 and a spring push 46. An opening 48 extending lengthwise through the coil spring 42 permits a lead-in tube 50 and/or portions of the optical fibers (not shown) to pass through the coil spring 42 toward the rear face 20 of the ferrule 14. The coil spring 42 may be a conventional helical spring having dead coils with ground ends in certain embodiments and open coils in other embodiments. The compressive force of the coil spring 42 may vary depending on the type of fiber optic connector and multifiber ferrule, but preferably is in the range of about 9-11 Newtons. The spring push 46 comprises a forward portion 52 for engaging the rearward most coil of the coil spring 42, and thereby retaining the coil spring 42 against the force of the spring seat 34. The spring push 46 further includes a rearward portion 54 that defines a crimp body 56 for securing the strength members of a fiber optic cable (not shown) to the spring push 46. The lead-in tube 50 may be positioned within an opening 58 of the spring push 46, the opening 48 of the coil spring 42 and/or the optical fiber channel 36 of the ferrule boot 25. In other embodiments, a lead-in tube 50 may not be provided. An opening 60 extending lengthwise through the lead-in tube 50, when provided, receives and guides the optical fibers into the respective bores 22 of the ferrule 14.

Figure 2:
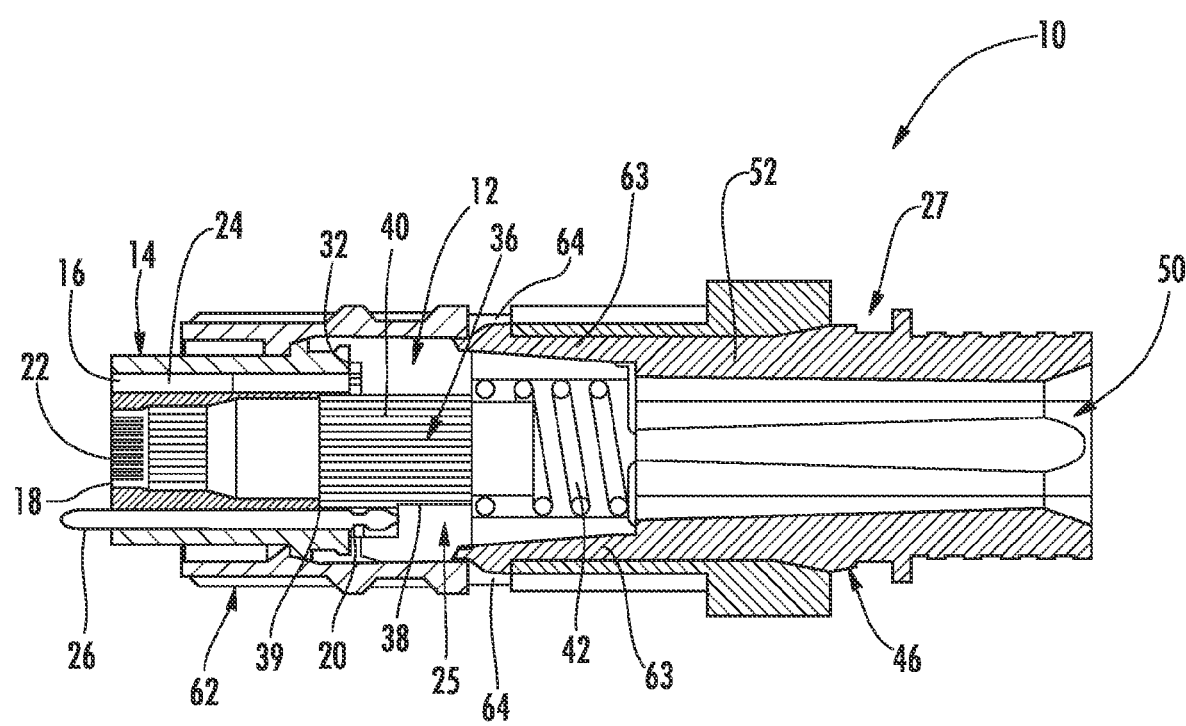
FIG. 2 is a section view of the optical fiber assembly of FIG. 1 is an assembled configuration.

Referring also to FIG. 2, the ferrule 14 and guide pins 26, the pin keeper 32, the ferrule boot 25, the coil spring 42, the forward portion 52 of the spring push 46 and the lead-in tube 50 may be positioned within a connector housing 62. Flexible arms 63 provided on spring push 46 depend lengthwise from the forward portion 52 to engage openings 64 formed in the connector housing 62 to secure the spring push 46 to the connector housing 62. A forward mechanical stop (not shown) is provided on the interior surface of the connector housing 62 so that the ferrule 14 is movably disposed within the connector housing 62, but is biased in the forward direction by the coil spring 42 and the ferrule boot 25.

Figure 3:
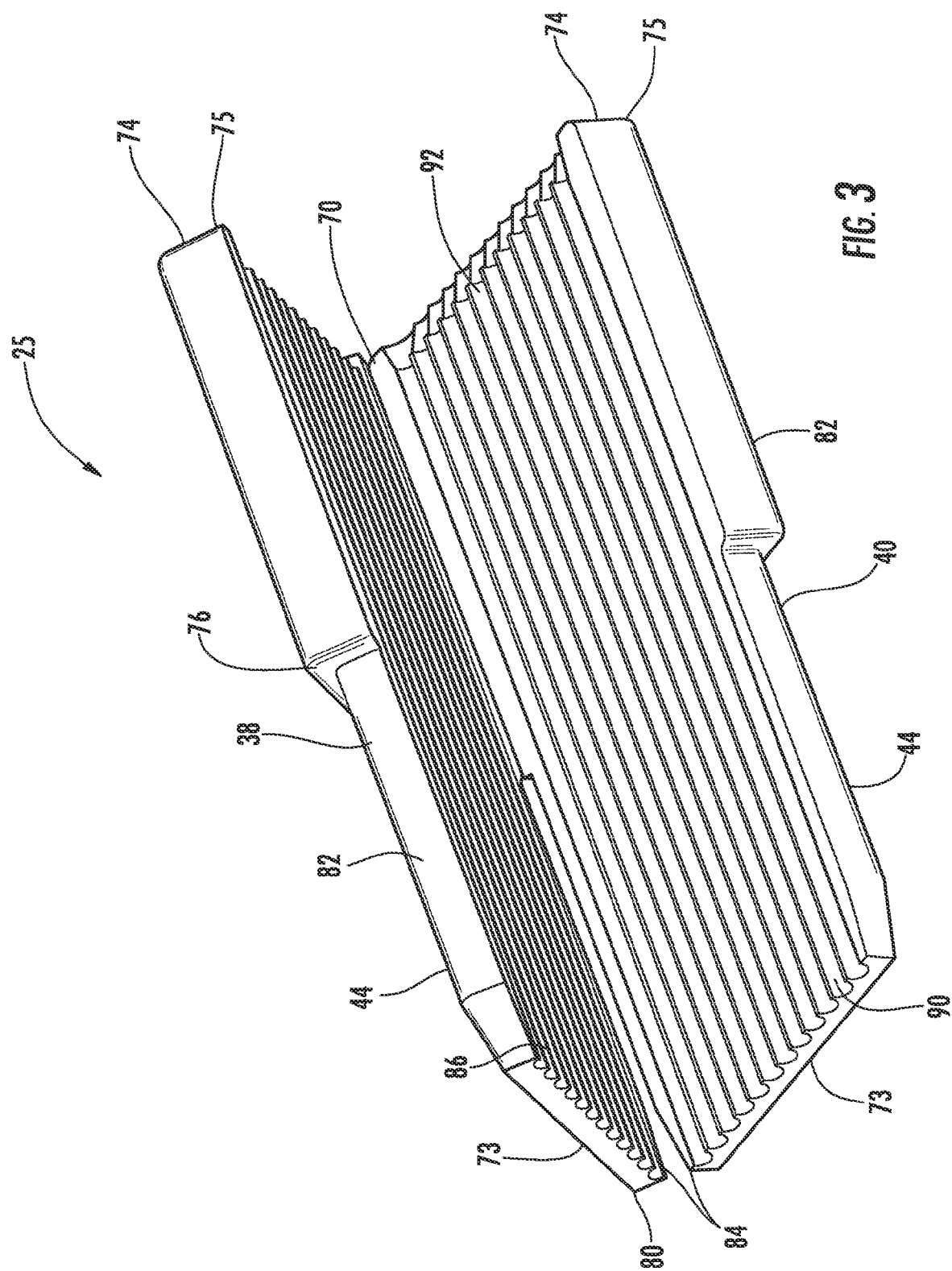
FIG. 3 is a perspective view of a ferrule boot for use with the optical fiber assembly of FIG. 1 in an open configuration according to one or more embodiments shown and described herein.

Referring to FIG. 3, the exemplary ferrule boot 25 is shown in isolation and in an open configuration. In this embodiment, the ferrule boot 25 includes the upper component 38 and the lower component 40. The upper component 38 may be hingedly connected to the lower component by a hinge 70 (e.g., a living hinge or other hinge component) forming a somewhat clamshell-type assembly of the upper and lower components 38 and 40.

Each upper and lower component 38 and 40 includes the forward portions 44 having a ferrule insertion end 73 and a rearward portion 74 having a fiber insertion end 75. The rearward portions 74 have a width and a height that is greater than a width and a height of the forward portions 44. Such a step-down arrangement can provide a step down surface 76 that can be used in positioning the ferrule boot 25 in the ferrule 14. In some embodiments, the hinge 70 extends along a length of only the rearward portions 74 and between the upper and lower components 38 and 40. In other embodiments, the hinge may extend along a length of both the upper and lower components 38 and 40. There may be multiple hinges, for example one hinge that extends along a length of the rearward portions 74 and another hinge that extends along a length of the forward portions 44.

The upper component 38 includes a grooved surface 80 that extends lengthwise between the ferrule insertion end 73 and the fiber insertion end 75 and widthwise between opposite sides 82 and 84. The grooved surface 80 includes a plurality of scalloped-shaped grooves 86 that are each dimensioned to receive at least one or more optical fibers. As used herein, the term "scalloped-shaped" broadly refers to a series of open-ended channels arranged side-by-side. The grooves 86 may be substantially parallel to each other and substantially perpendicular to the ferrule insertion end 73 and/or the fiber insertion end 75. Other arrangements for the grooves 86 are possible.

The lower component 40 also includes a grooved surface 90 that extends lengthwise between the ferrule insertion end 73 and the fiber insertion end 75 and widthwise between opposite sides 82 and 84. The grooved surface 90 includes a plurality of scalloped-shaped grooves 92 that are each dimensioned to receive at least one or more optical fibers. The grooves 92 may be substantially parallel to each other and substantially perpendicular to the ferrule insertion end 73 and/or the fiber insertion end 75. Other arrangements for the grooves 92 are possible.

Figure 4:
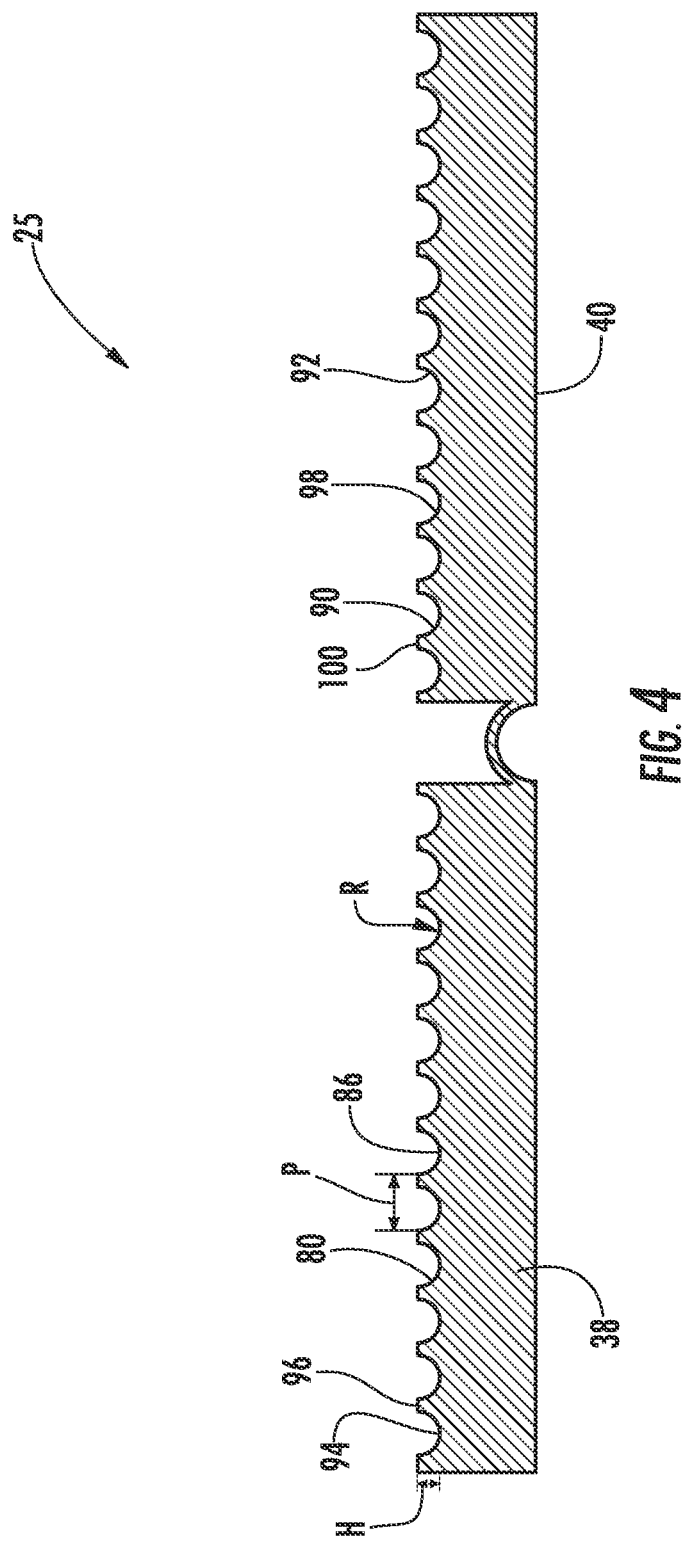
FIG. 4 is a section view of the ferrule boot of FIG. 3 in a flat, laid out configuration.

Referring to FIG. 4, the ferrule boot 25 is illustrated in section and in a flat, laid-out configuration. The upper component 38 includes the grooved surface 80 with the grooves 86. Each groove 86 may include a valley 94 and at least one peak 96 that extends lengthwise alongside the valley 94. In some embodiments, two or more of the peaks 96 may have a height H from a lowest point of the adjacent valley 94 that is substantially the same such that tops of the two or more peaks 96 lie within the same horizontal plane. For example, H may be between about 120 microns and 130 microns, such as about 125 microns. In some embodiments, all of the tops of the peaks 96 may lie in the same horizontal plane. Likewise, two or more of the valleys 94 may have their lowest points lying within the same horizontal plane. In some embodiments, all of the lowest points of the valleys 94 may lie in the same horizontal plane.

The lower component 40 also includes the grooved surface 90 with the grooves 92. Each groove 92 may include a valley 98 and at least one peak 100 that extends lengthwise alongside the valley 98. In some embodiments, two or more of the peaks 100 may have a height H from a lowest point of the adjacent valley 98 that is substantially the same such that tops of the two or more peaks 100 lie within the same horizontal plane. In some embodiments, all of the tops of the peaks 100 may lie in the same horizontal plane. Likewise, two or more of the valleys 98 may have their lowest points lying within the same horizontal plane. In some embodiments, all of the lowest points of the valleys 98 may lie in the same horizontal plane.

In some embodiments, such as the one shown, the grooves 86 and 92 may each have a substantially rounded shape where at least a portion of the grooves has a radius R. For example, the radius may be between about 60 microns and 65 microns. The radii R may be the same for each of the grooves 86 and 92 or radii R for at least some or one of the grooves 86 and 92 maybe different, for example, to either accommodate optical fibers of substantially the same diameter or of substantially different diameters. In some embodiments, at least a portion of the peaks 96 and 100 may be substantially vertical. In other embodiments, the peaks 96 and 100 may be curved along their entire height.

Any suitable number of product holding grooves 86 and 92 maybe used. Additionally, each of the upper and lower components 38 and 40 may include the same number of grooves 86 and 92. In one exemplary embodiment, each upper component 38 and lower component 40 includes 12 grooves 86 and 92, respectively. However, more or less than 12 grooves 86 and 92 may be utilized. In some embodiments, the grooves 86 and 92 of each upper component 38 and lower component 40 have a substantially constant pitch P between adjacent grooves 86 and 92. In other embodiments, the pitch P may change. The pitch P of the upper component 38 and the lower component 40 may be measured between equivalent points on adjacent grooves 86 and 92. The pitch P may be between about 240 microns and 260 microns. In some embodiments, the pitch of the grooves 86 matches the pitch of the grooves 92.

Figure 5:
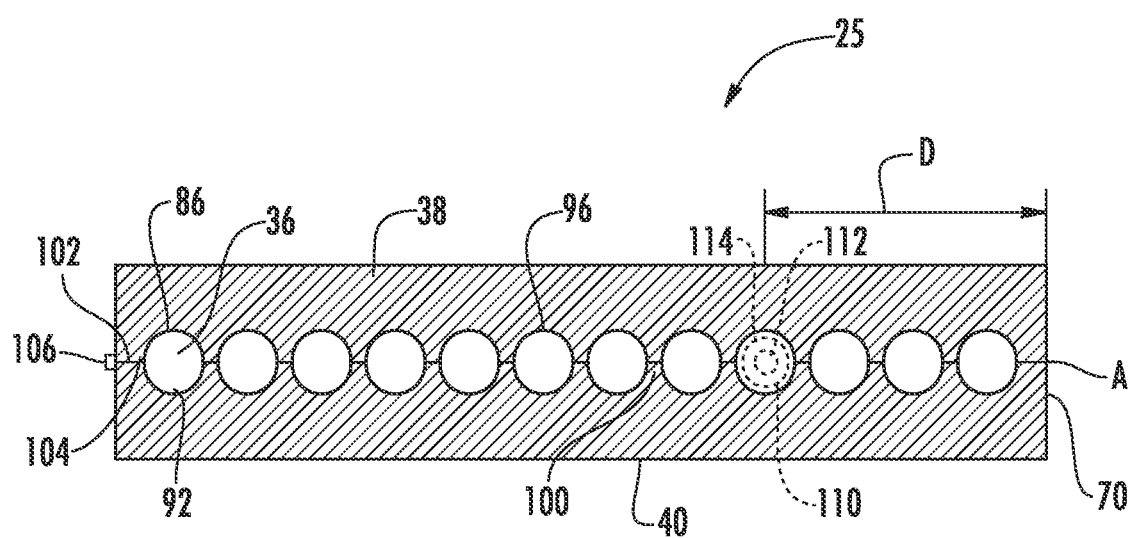
FIG. 5 is a section view of the ferrule boot of FIG. 3 in a closed configuration.

Referring to FIG. 5, the ferrule boot 25 is illustrated in a closed configuration with the upper component 38 engaged with the lower component 40. In the closed configuration, the grooves 86 of the upper component 38 are substantially aligned with the grooves 92 of the lower component to form the plurality of fiber receiving channels 36. The grooves 86 of the upper component 38 may be substantially aligned with the grooves 92 of the lower component 40 due to the grooves 86 and 92 having substantially the same pitch P and/or each groove 86 and 92 forming an individual fiber receiving channel 36 being substantially the same lateral distance D from the pivot axis A of the hinge 70.

An upper rim 102 of the upper component 38 may engage a lower rim 104 of the lower component 40 with the ferrule boot 25 in the closed configuration. In some embodiments, the upper rim 102 and the lower rim 104 may extend at least partially about the peripheries of the groove surfaces 80 and 90. At least some or all of the peaks 96 and 100 of the upper component 38 and the lower component 40 may also engage to form the respective fiber receiving channels 36. Alternatively, at least some or all of the peaks 96 and 100 may not engage each other to form the respective fiber receiving channels 36. Once closed, the upper component 38 maybe secured in the closed configuration to the lower component 40 using any suitable locking feature 106, such as a coupling pin, an adhesive, a snap fit or tacking.

Prior to securing the upper component 38 to the lower component 40, the plurality of optical fibers may be positioned in the grooves 86 and/or 92. In FIG. 5, an optical fiber (represented by dotted lines 110) is illustrated within one of the fiber receiving channels 36. The optical fiber 110 generally includes a core 112 and an outer sheath or cladding 114. The outer diameter of the cladding 114, in this example, forms the outer diameter of the optical fiber 110. The optical fiber 110 may be secured within the fiber receiving channel 36 using any suitable means, such as a pressure fit, adhesive, etc. Where a pressure fit is used, the width and/or height of the fiber receiving channel 36 may be the same as or less than the outer diameter of the optical fiber 110. In some embodiments, the width and/or height of the fiber receiving channel 36 may be between about 95 percent and 105 percent of the outer diameter of the optical fiber 110. The width and/or height of the fiber receiving channels 36 may be selected to provide a suitable pressure fit for the optical fiber 110 without applying excessive pressure against or damaging the core 112.

In some embodiments, the upper component 38 and/or the lower component 40 maybe color-coded to match a color of a corresponding optical fiber. For example, the fiber receiving channel 36 of optical fiber 110 may be color-coded red to match the red color of the cladding 114 of the optical fiber 110. The other individual fiber receiving channels 36 may be color-coded different colors, such as blue, green, black, yellow, orange, purple, etc. Such color coding can assist in assembly of the optical fibers into their respective fiber receiving channels 36 and reduce any need for reworking.

Figure 6:
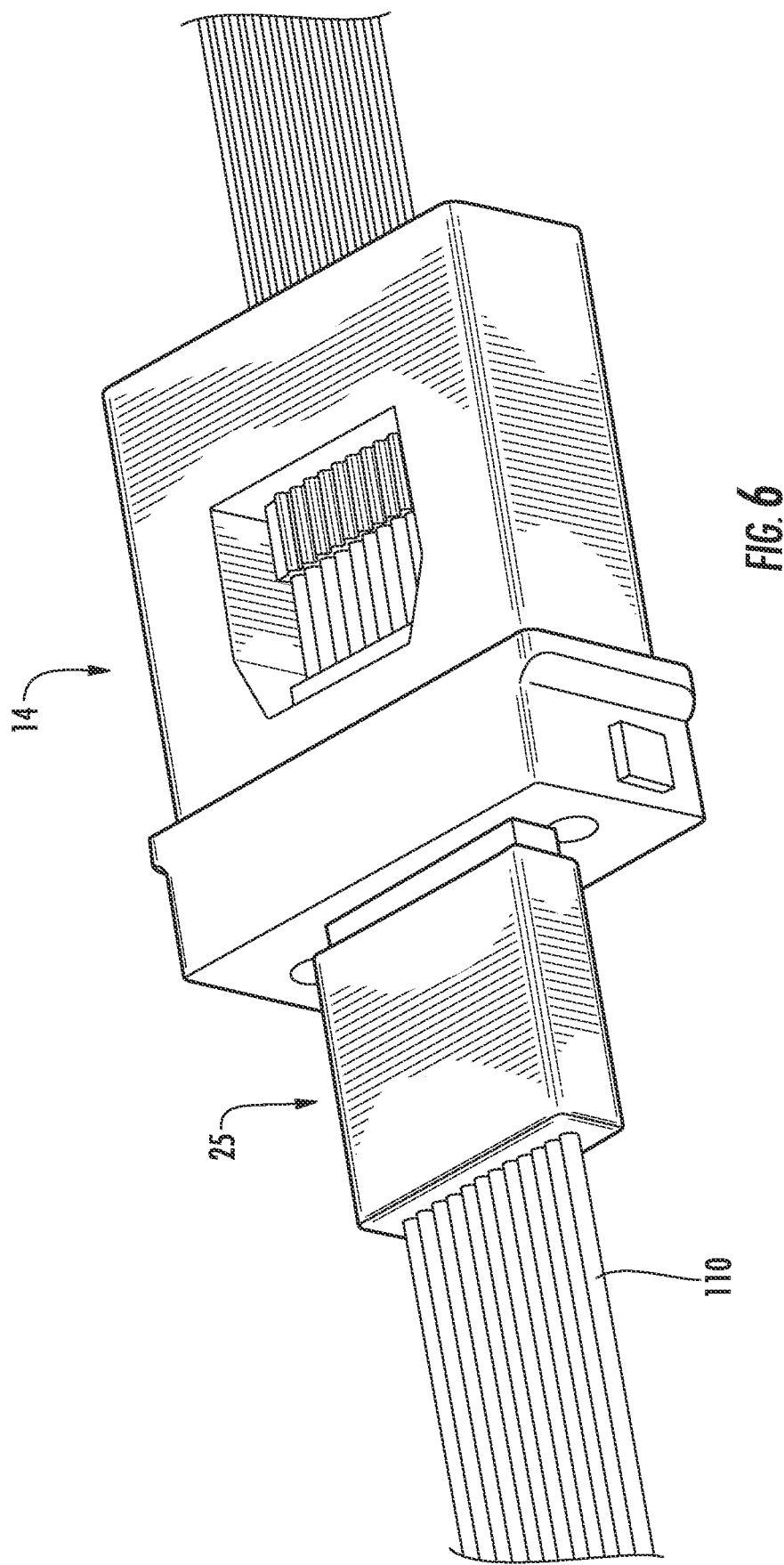
FIG. 6 is a perspective view of the ferrule boot of FIG. 3 connected to a ferrule according to one or more embodiments shown and described herein.

Referring to FIG. 6, the ferrule boot 25 is shown inserted into the ferrule 14. As can be seen, the ferrule boot 25 aligns and organizes the plurality of optical fibers 110 for their incorporation into the ferrule 14. While only a single row of optical fibers 110 is illustrated, there may be multiple rows of optical fibers.

Figure 7:
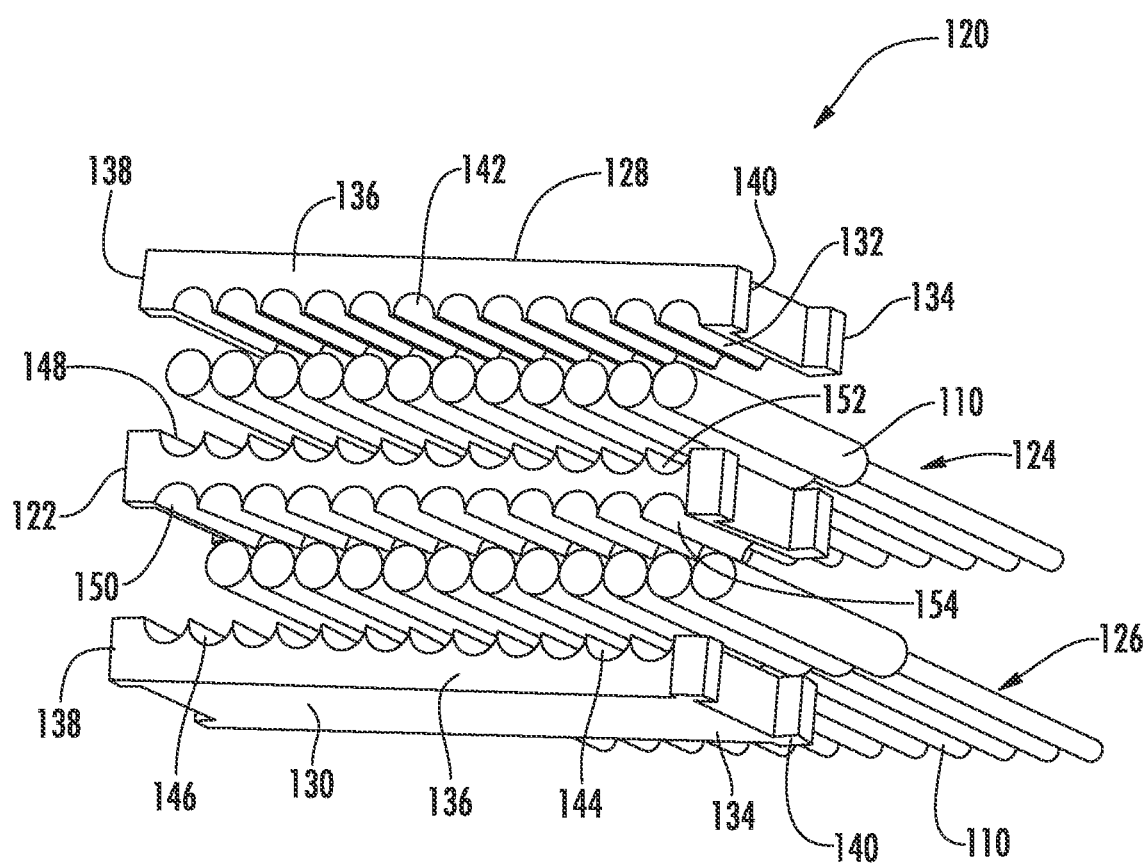
FIG. 7 is a perspective view of another ferrule boot for use with the optical fiber assembly of FIG. 1 according to one or more embodiments shown and described herein.

Referring to FIG. 7, another exemplary ferrule boot 120 includes an intermediate optical fiber holder 122 that accommodates multiple rows 124 and 126 of optical fibers 110. The intermediate optical fiber holder 122 is located between an upper component 128 and a lower component 130.

The upper component 128 includes a grooved surface 132 that extends lengthwise between a ferrule insertion end 134 and a fiber insertion end 136 and widthwise between opposite sides 138 and 140. The grooved surface 132 includes a plurality of scalloped-shaped grooves 142 that are each dimensioned to receive at least one or more optical fibers 110.

The lower component 130 also includes a grooved surface 144 that extends lengthwise between the ferrule insertion end 134 and the fiber insertion end 136 and widthwise between opposite sides 138 and 140. The grooved surface 144 includes a plurality of scalloped-shaped grooves 146 that are each dimensioned to receive at least one or more optical fibers 110.

The intermediate fiber optic holder 122 includes a pair of grooved surfaces 148 and 150 with grooved surface 148 facing the grooved surface 132 of the upper component 128 and grooved surface 150 facing the grooved surface 144 of the lower component 130. The grooved surface 148 includes a plurality of scalloped-shaped grooves 152 and the grooved surface 150 includes a plurality of scalloped-shaped grooves 154.

Figure 8:
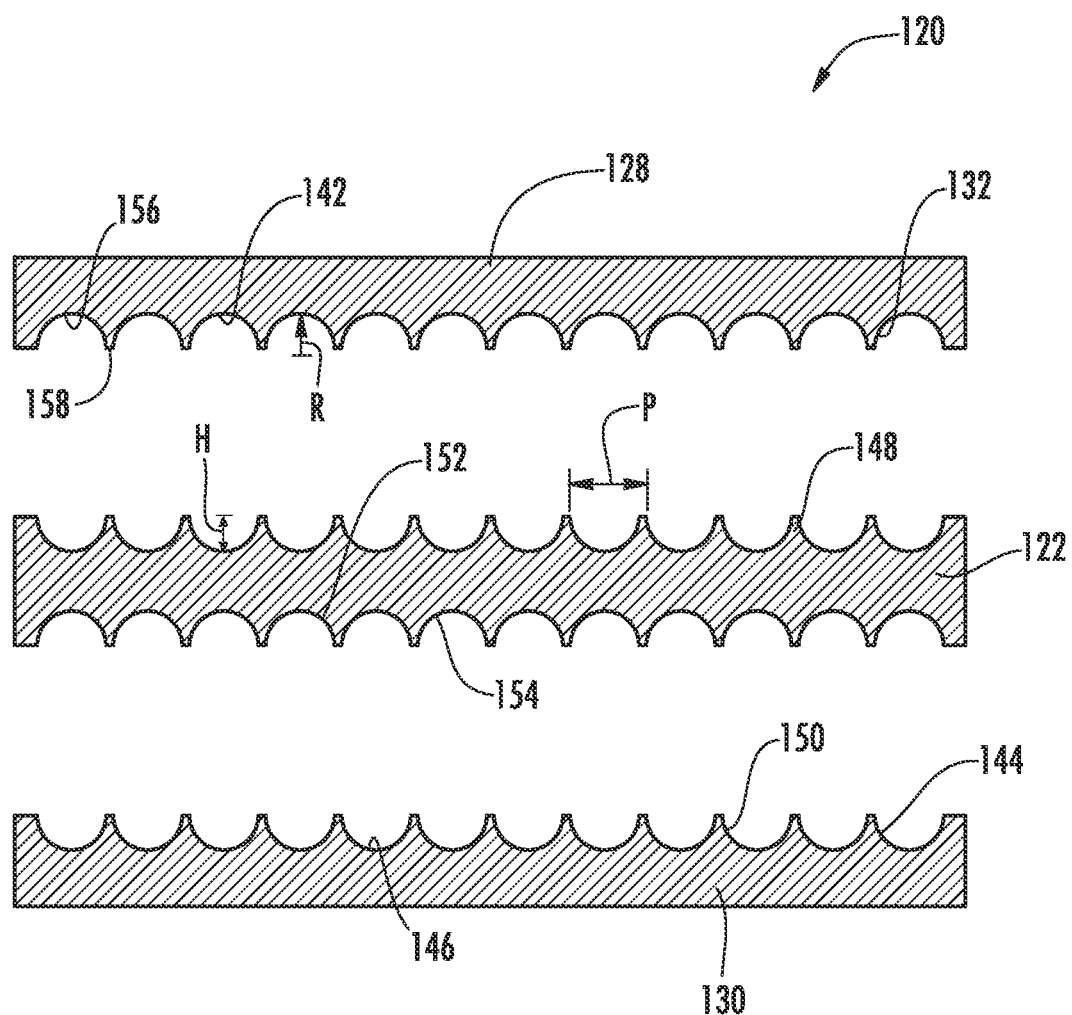
FIG. 8 is a section view of the ferrule boot of FIG. 7 in an open configuration.

Referring to FIG. 8, in a fashion similar to that described above, the grooves 142, 146, 152 and 154 may each include valleys 156 and peaks 158 where the valleys may have a radius R (for rounded-shaped valleys) and the peaks may have a height H. The grooves 142, 146, 152 and 154 of each of the grooved surfaces 132, 144, 148 and 150 may also have a pitch P that may be constant or may change over the widths of the individual upper, intermediate and lower components 128, 122 and 130. As can be seen by FIG. 8, the upper component 128, the intermediate fiber optic holder 122 and the lower component 130 may be separate from each other in the illustrated open configuration. In other embodiments, one or more of the upper component 128, intermediate fiber optic holder 122 and lower component 130 maybe connected, for example, using one or more hinges.

Figure 9:
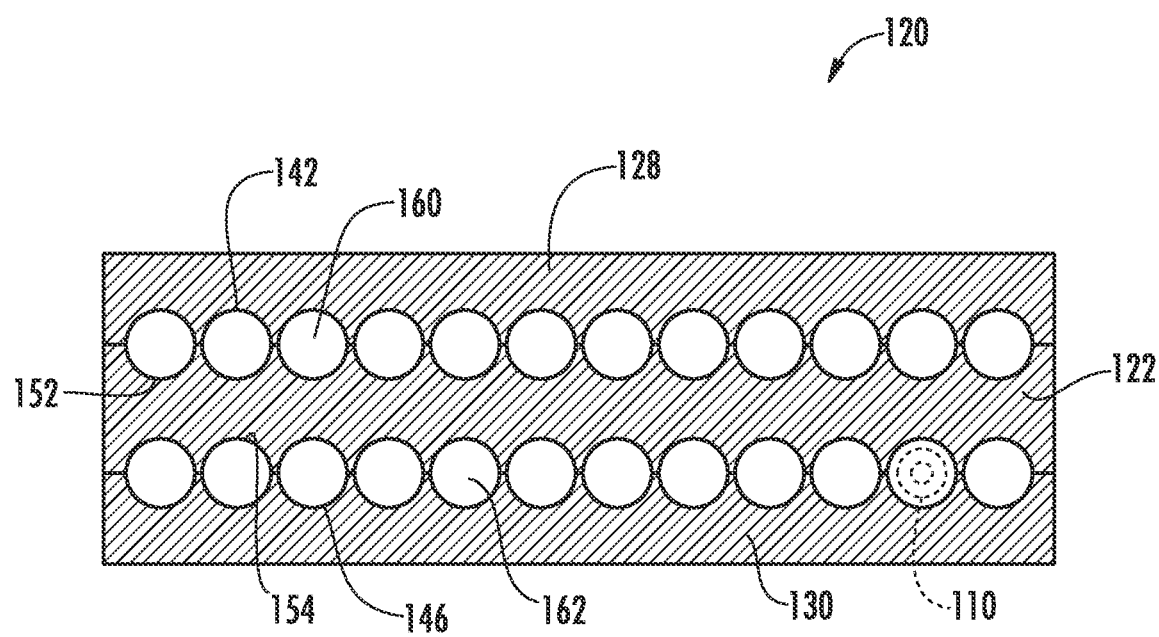
FIG. 9 is a section view of the ferrule boot of FIG. 7 in a closed configuration.

Referring to FIG. 9, the upper component 128, intermediate fiber optic holder 122 and lower component 130 are illustrated in a closed configuration with the upper component 128, intermediate optic fiber holder 122 and lower component 130 secured together. In the closed configuration, the grooves 142 of the upper component 128 are substantially aligned with the grooves 152 of the intermediate fiber optic holder 122 to form a first, upper plurality of fiber receiving channels 160. The grooves 154 of the intermediate fiber optic holder 122 are substantially aligned with the grooves 146 of the lower component 130 to form a second, lower plurality of fiber receiving channels 162. The grooves 142, 152 and 154, 146 may be substantially aligned due to the grooves 142, 152 and 154, 146 having substantially the same pitch P, as an example. Once closed, the upper component 128, intermediate fiber optic holder 122 and lower component 130 may be secured in the closed configuration using any suitable locking feature, such as a coupling pin, an adhesive, a snap fit or tacking.

Prior to securing the upper component 128, intermediate fiber optic holder 122 and lower component 130, the plurality of optical fibers maybe positioned in the grooves 142, 146, 152 and 154. In FIG. 9, an optical fiber (represented by dotted lines 110) is illustrated within one of the upper plurality of fiber receiving channels 160 and another optical fiber 110 is illustrated within one of the lower plurality of fiber receiving channels 162. The optical fiber 110 may be secured within the fiber receiving channels 160 and 162 using any suitable means, such as a pressure fit, adhesive, etc.

The ferrule boots 25 and 120 may be formed by any suitable means, such as molding, extrusion, machining, etc. As one example, the ferrule boots 25 and 120 may be formed using a molding process. Where the ferrule boot has a hinge, such as a living hinge, the hinge may be formed during the molding process such that, for example, the upper and lower components are connected together as molded. Any suitable material may be used to form the ferrule boots 25 and 120, such as flexible polyolefin, modified fluoroelastomer, or PVC.

The above-described ferrule boots can hold optical fiber arrays together, which can reduce any reworking need and scrap due to delamination. The ferrule boots can eliminate the use of tapes and other bonding substrates commonly used to ribbonize the array of optical fibers by providing a preformed adhesive liner within the ferrule boots that can be melted upon application of thermal energy. Additionally, there is no need for use of razor blades or other sharp objects in removing excess tape. The ferrule boots can work for a variety of fiber arrays such as between 2 and 24 optical fibers and multiple fiber rows. The ferrule boots can also serve as a reference point for downstream processes such as stripping cladding.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A ferrule assembly comprising:
a ferrule comprising a ferrule boot insertion end; and
a ferrule boot comprising:
a lower component comprising a first grooved surface, wherein the first grooved surface comprises a plurality of first grooves that are dimensioned to receive a plurality of optical fibers; and
an upper component comprising a second grooved surface, wherein the second grooved surface comprises a plurality of second grooves that are dimensioned to receive the plurality of optical fibers, wherein:
the lower component is coupled to the upper component such that individual ones of the plurality of first grooves are substantially aligned with individual ones of the plurality of second grooves;
the lower component and the upper component define a fiber insertion end and a ferrule insertion end of the ferrule boot; and
the ferrule insertion end of the ferrule boot is at least partially positioned within the ferrule at the ferrule boot insertion end.

2. The ferrule assembly of claim 1, wherein the plurality of first grooves and the plurality of second grooves are scalloped-shaped and form a plurality of fiber receiving channels extending lengthwise through the ferrule boot.

3. The ferrule assembly of claim 2, wherein individual ones of the plurality of fiber receiving channels have a diameter such that the plurality of optical fibers are maintained within the plurality of fiber receiving channels by a pressure fit.

4. The ferrule assembly of claim 1, wherein the first grooved surface comprises between two and 24 first grooves and the second grooved surface comprises two and 24 second grooves.

5. The ferrule assembly of claim 1, wherein the lower component is coupled to the upper component by a hinge at an edge portion of the lower component and an edge portion of the upper component.

6. The ferrule assembly of claim 1, wherein the individual ones of the plurality of the first grooves and/or the individual ones of the plurality of second grooves are color-coded such that a color of an individual first groove and/or a corresponding individual second groove is associated with a color of a corresponding optical fiber.

7. The ferrule assembly of claim 1, wherein the fiber insertion end has a width and a height in cross section that is greater than a width and a height of the ferrule insertion end in cross section.

8. The ferrule assembly of claim 7, wherein the fiber insertion end of the ferrule boot contacts the ferrule when the ferrule boot is positioned within the ferrule.

9. The ferrule assembly of claim 1, further comprising an intermediate optical fiber holder comprising a third grooved surface and a fourth grooved surface, wherein:
the third grooved surface comprises a plurality of third grooves;
the fourth grooved surface comprises a plurality of fourth grooves;
the intermediate optical fiber holder is positioned between the lower component and the upper component such that:
the individual ones of the plurality of first grooves are substantially aligned with the individual ones of the plurality of third grooves, thereby forming a first plurality of fiber receiving channels positioned in a first plane; and
the individual ones of the plurality of second grooves are substantially aligned with the individual ones of the plurality of fourth grooves, thereby forming a second plurality of fiber receiving channels positioned in a second plane.

10. The ferrule assembly of claim 9 further comprising one or more additional intermediate optical fiber holders that define one or more additional plurality of fiber receiving channels.

11. The ferrule assembly of claim 1, wherein the ferrule boot inhibits an epoxy inserted into the ferrule from escaping the ferrule boot insertion end when the ferrule insertion end of the ferrule boot is positioned within the ferrule boot insertion end of the ferrule and the epoxy is applied to the ferrule.

12. The ferrule assembly of claim 1, wherein the ferrule insertion end of the ferrule boot is maintained within the ferrule boot insertion end of the ferrule by a snap fit, an interference fit or an adhesive.

13. The ferrule assembly of claim 1, wherein the ferrule boot further comprises a rear spring centering protrusion.

14. The ferrule assembly of claim 1, wherein the ferrule boot further comprises a spring cup interfacing portion.

15. The ferrule assembly of claim 1, wherein the upper component is secured to the lower component by a coupling pin, an adhesive, a snap fit, or tacking.

16. The ferrule assembly of claim 1, wherein the ferrule assembly is a portion of a connector or a cable assembly.

17. The ferrule assembly of claim 1, wherein a geometry of the upper component is symmetrical with respect to a geometry of the lower component.

18. The ferrule assembly of claim 1 further comprising an intermediate fiber holder comprising a third grooved surface and a fourth grooved surface, wherein:
the third grooved surface comprises a plurality of third grooves;
the fourth grooved surface comprises a plurality of fourth grooves;
the intermediate fiber holder is positioned between the lower component and the upper component such that:
the individual ones of the plurality of first grooves are substantially aligned with individual ones of the plurality of third grooves, thereby forming a first plurality of fiber receiving channels positioned in a first plane; and
the individual ones of the plurality of second grooves are substantially aligned with individual ones of the plurality of fourth grooves, thereby forming a second plurality of fiber receiving channels positioned in a second plane.

19. The ferrule assembly of claim 14 further comprising one or more additional intermediate fiber holders that define one or more additional plurality of fiber receiving channels.

20. An optical fiber organizer comprising:
a lower component comprising a first grooved surface, wherein the first grooved surface comprises a plurality of first scalloped-shaped grooves that are dimensioned to receive a first plurality of optical fibers; and
an upper component comprising a second grooved surface, wherein the second grooved surface comprises a plurality of second scalloped-shaped grooves that are dimensioned to receive a second plurality of optical fibers; and
an intermediate fiber holder comprising a third grooved surface and a fourth grooved surface, wherein the third grooved surface comprises a plurality of third scalloped-shaped grooves that are dimensioned to receive the first plurality of optical fibers, and the fourth grooved surface comprises a plurality of fourth scalloped-shaped grooves that are dimensioned to receive the second plurality of optical fibers;

wherein the first grooved surface of the lower component is coupled to the third grooved surface of the intermediate fiber holder, and the second grooved surface of the upper component is coupled to the fourth grooved surface of the intermediate fiber holder, such that:
the intermediate fiber holder is positioned between the lower component and the upper component;
individual ones of the plurality of first scalloped-shaped grooves are substantially aligned with individual ones of the plurality of third scalloped-shaped grooves, thereby forming a first plurality of fiber receiving channels positioned in a first plane; and
individual ones of the plurality of second scalloped-shaped grooves are substantially aligned with individual ones of the plurality of fourth scalloped-shaped grooves, thereby forming a second plurality of fiber receiving channels positioned in a second plane.

21. The optical fiber organizer of claim 20, further comprising one or more additional intermediate fiber holders that define one or more additional plurality of fiber receiving channels.

22. An optical fiber assembly comprising:
a plurality of optical fibers having an insertion end;
a ferrule boot comprising:
a lower component comprising a first grooved surface, wherein the first grooved surface comprises a plurality of first scalloped-shaped grooves; and
an upper component comprising a second grooved surface, wherein the second grooved surface comprises a plurality of second scalloped-shaped grooves;
wherein:
the lower component is coupled to the upper component such that individual ones of the plurality of first scalloped-shaped grooves are substantially aligned with individual ones of the plurality of second scalloped-shaped grooves, thereby forming a plurality of fiber receiving channels extending lengthwise through the ferrule boot;
the plurality of optical fibers are secured within the plurality of fiber receiving channels; and
the lower component and the upper component define a fiber insertion end and a ferrule insertion end;
a ferrule comprising a ferrule channel therein and a ferrule boot insertion end, wherein:
the ferrule insertion end of the ferrule boot is positioned within the ferrule channel at the ferrule boot insertion end of the ferrule; and
the plurality of optical fibers is secured within the ferrule.

23. A method of fabricating an optical fiber assembly comprising:
positioning a plurality of optical fibers onto a portion of a ferrule boot in a desired sequence such that an exposed portion of the plurality of optical fibers extend beyond an edge of the ferrule boot, the ferrule boot comprising:
a lower component comprising a first grooved surface, wherein the first grooved surface comprises a plurality of first grooves; and
an upper component coupled to the lower component, the upper component comprising a second grooved surface, wherein the second grooved surface comprises a plurality of second grooves;
wherein:
individual ones of the plurality of first grooves are substantially aligned with individual ones of the plurality of second grooves, thereby forming a plurality of fiber receiving channels extending lengthwise through the ferrule boot; and the lower component and the upper component define a fiber insertion end and a ferrule insertion end of the ferrule boot;

securing the upper component to the lower component such that the plurality of optical fibers are positioned within the plurality of fiber receiving channels by a pressure fit;

positioning the exposed portion of the plurality of optical fibers into a ferrule; and securing the plurality of optical fibers to the ferrule.

24. The method of claim 23, further comprising removing a protective cover of individual ones of the plurality of optical fibers, thereby forming a stripped region of the plurality of optical fibers at the exposed portion.

\* \* \* \* \*